United States Patent [19]

Price

[11] 4,303,114

[45] Dec. 1, 1981

[54] METHOD FOR THE CONSTRUCTION OF IMPROVED TIRE LINERS

[76] Inventor: Donald R. Price, 210 Elvin Ct., Lansing, Mich. 48912

[21] Appl. No.: 217,910

[22] Filed: Dec. 18, 1980

Related U.S. Application Data

[63] Continuation-in-part of Ser. No. 51,720, Jun. 25, 1979, Pat. No. 4,262,719.

[51] Int. Cl.³ .............................................. B60C 5/18
[52] U.S. Cl. .................................. 152/192; 152/203; 152/348; 156/110 R; 156/123 R; 156/220; 156/221; 428/65
[58] Field of Search ............... 152/155, 157, 158, 192, 152/195, 196, 197, 203, 204–207, 330 R, 330 RF, 346–348, 349, 350, 352–354, 357, 360, 361 R, 374; 156/96, 110 R, 118, 121, 123 R, 215, 216, 218, 220, 221, 245; 428/64–66, 35, 36

[56] References Cited

U.S. PATENT DOCUMENTS

| | | |
|---|---|---|
| 521,006 | 6/1894 | Schindel . |
| 1,168,709 | 1/1916 | Clay . |
| 1,176,424 | 3/1916 | Brady . |
| 1,181,065 | 4/1916 | Coffield . |
| 1,371,097 | 3/1921 | Jones . |
| 1,384,243 | 7/1921 | Disbrow . |
| 1,460,794 | 7/1923 | Grube . |
| 2,781,074 | 2/1957 | Howard . |
| 4,197,893 | 4/1980 | O'Coin . |

*Primary Examiner*—John E. Kittle
*Attorney, Agent, or Firm*—Ian C. McLeod

[57] ABSTRACT

An improved method for the construction of tire liners (19) incorporating a core strip (10) of high temperature and pressure (HPT) molded and vulcanized rubber or another tread supporting material which allows low temperature and pressure (LPT) vulcanizable rubber to flow and to bond the core in place in the liners is described. The tire liner preferably includes LPT vulcanized rubber (16, 17 and 18) surrounding the HPT strip (10) with flexible wings (16) on the side resulting from the flow of vulcanizable LPT rubber during molding of the tire liner. The LPT rubber as vulcanizable sheets 11 and 12 is preferably wrapped around the strip of HPT rubber in such a manner that during molding the rubber flows to the short sides (10b) of the HPT core to form the flexible LPT wings on the tire liner. The tire liner is adapted for mounting inside pneumatic tires adjacent the tread (102) to provide protection against objects penetrating the tread and to stabilize the tread.

15 Claims, 8 Drawing Figures

METHOD FOR THE CONSTRUCTION OF IMPROVED TIRE LINERS

CROSS-REFERENCE TO RELATED APPLICATIONS

This application is a continuation-in-part of application Ser. No. 51,720, filed June 25, 1979 by the inventor herein now U.S. Pat. No. 4,262,719.

BACKGROUND OF THE INVENTION

1. Field of the Invention

The present invention relates to an improved method for the preparation of improved tire liners which utilize a strip of high temperature and pressure (HPT) molded and vulcanized rubber or another tread supporting material which allows low temperature and pressure (LPT) vulcanizable rubber to flow to and bond to the strip. In particular the present invention relates to a method wherein during molding and vulcanization LPT vulcanizable rubber is caused to flow to the short sides of the HPT strip to form highly flexible and elastic wings.

2. Prior Art

Tire liners which fit inside a pneumatic tire casing adjacent to the tread to provide puncture protection are well known to those skilled in the art. The present invention relates to a type of tire liner which relies upon the materials of construction of the liner in order to resist penetration of objects through the liner to the inside of a tire, particularly to an inner tube which if punctured causes a flat tire. U.S. Pat. No. 4,197,893 to O'Coin describes a foamed tire liner. The liner also acts to stabilize the tread area of the tire.

In prior application Ser. No. 139,430, filed Apr. 11, 1980 now U.S. Pat. No. 4,263,074, which is based upon application Ser. No. 59,720, filed June 25, 1979, the prior art in relation to tire liners is described in great detail. This prior art does not describe a tire liner made from HPT and LPT strips of rubber. U.S. Pat. Nos. 521,006; 1,371,097; 1,384,243; 1,460,794; 1,168,709; 1,176,424; 1,181,065; and 2,781,074 show other liners.

The present invention relates to an improvement in the method for the fabrication of tire liners using an HPT strip as described in the preceding applications Ser. Nos. 51,720 and 139,430 as well as using other similar tread supporting materials. In the construction of tire liners according to the preferred method of the preceding applications, strips of LPT vulcanizable rubber were bonded at least along the short sides of a HPT core strip as wings and the resulting composite was then molded and vulcanized to form the tire liner. This method produces a very satisfactory tire liner; however, considerable effort is needed to provide the LPT strips on the short sides of the HPT strip. Cutting and shaping of LPT rubber is disclosed in order to produce the wings.

OBJECTS

It is therefore an object of the present invention to provide an improved method for the manufacture of an improved tire liner incorporating a core strip wherein the LPT vulcanizable rubber wings are provided on the short sides of the strip as a result of flow of the LPT rubber along the long sides of the strip during molding and vulcanization. It is particularly an object of the present invention to provide a method which is relatively simple to perform and which is economical.

These and other objects will become increasingly apparent by reference to the following description and to the drawings.

IN THE DRAWINGS

GENERAL DESCRIPTION

Figure 1:
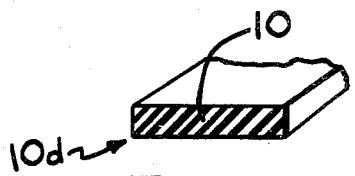
FIG. 1 is a perspective cross-sectional view of an elongate first strip of HPT vulcanizable rubber or other tread supporting material which forms the core of the tire liner.

The present invention relates to the improvement in the method for preparing an annular shaped tire liner adapted to fit around and in contact with the inside U-shaped surface of a casing which is part of a pneumatic tire, wherein the tire has spaced apart annular sidewalls supporting a tread and circular beads around the tire on each sidewall for mounting on a rim, wherein the tire liner includes an annular strip of a tread supporting material defining an annular length and a width such that the strip is positionable adjacent to the U-shaped surface of the tire casing opposite the tread, and wherein the width of the annular strip is defined by two opposite long sides which are between two opposite short sides defining a thickness along the length, the improvement which comprises the steps of: providing a first elongate strip of a tread supporting material which allows low temperature and pressure vulcanizable rubber to flow around and to bond to the first strip and with ends adapted to be joined together to form the annular strip; providing at least one second elongate strip of low temperature and pressure (LPT) vulcanizable rubber bonded on at least one long side of the first strip; forming the bonded first and second elongate strips into the annular strip by joining the ends of the first strip together; and molding and vulcanizing the LPT vulcanizable rubber to the first strip to form an annular shaped tire liner, wherein some of the LPT vulcanizable rubber flows across the long side width to the short sides of the first annular strip.

The present invention relates to the improvement in the method for preparing an annular shaped tire liner adapted to fit around and in contact with the inside U-shaped surface of a casing which is part of a pneumatic tire, wherein the tire has spaced apart annular sidewalls supporting a tread and circular beads around the tire on each sidewall for mounting on a rim, wherein the tire liner includes an annular strip of a high temperature and pressure (HPT) vulcanized rubber defining an annular length which conforms to the shape of the U-shaped surface of the tire casing opposite the tread, and wherein the strip has a width across the tread defined by two opposite long sides which are between two opposite short sides defining a thickness along the length the improvement which comprises the steps of: providing the HPT vulcanized rubber as a first elongate strip with ends defining a length adapted to be joined together to form the annular strip of rubber; providing at least one second elongate strip of low temperature and pressure (LPT) vulcanizable rubber bonded on at least one long side of the first strip; forming the bonded first elongate strip with the second elongate strip into the annular strip by joining and bonding the ends of the first HPT strip together; and vulcanizing the LPT vulcanizable rubber to the annular strip in a closed mold to form the tire liner, wherein some of the LPT vulcanizable rubber flows across the long side width to both short sides of the first annular strip of HPT vulcanized rubber.

The present invention particularly relates to the improvement in the method for preparing an annular shaped tire liner adapted to fit around and in contact with the inside U-shaped surface of a casing which is part of a pneumatic tire and around and in contact with the outside of an inner tube for the tire so as to be between the inner tube and the casing to reduce the frequency of flat tires, wherein the tire has spaced apart annular sidewalls supporting a tread and circular beads around the tire on each sidewall for mounting on a rim, wherein the tire liner includes an annular strip of a high temperature and pressure (HPT) vulcanized rubber defining an annular length which conforms to the shape of the U-shaped surface of the tire casing opposite the tread and wherein the strip has a width across the tread defined by two opposite long sides which are between two opposite short sides defining a thickness along the length and wherein the tire liner provides for substantial protection against and resistance to penetration of the inside casing to the inner tube by a foreign object the improvement which comprises the steps of: providing the HPT vulcanized rubber as a first elongate strip with ends defining a length adapted to be joined together to form the annular strip of rubber; providing at least two thin cross-sectioned second elongate strips of low temperature and pressure (LPT) vulcanizable rubber bonded on the long sides of the first strip, each of the LPT strips having widths which are greater than the width of one long side of the first elongate strip, which are wrapped around and bonded to both short sides and one long side of the first elongate strip such that there is one second elongate strip across each long side of the first elongate strip; forming the bonded first elongate strip with the second elongate strip into the annular strip by joining the ends of the first HPT strip together such that there is LPT vulcanizable rubber surrounding the joined ends of the first strip; and vulcanizing the LPT vulcanizable rubber to the annular strip in a closed mold to form the tire liner, wherein some of the LPT vulcanizable rubber flows across the long side widths to both short sides of the first annular strip of HPT vulcanized rubber.

The present invention also relates to the improvement in a tire liner adapted to fit around and in contact with the inside U-shaped surface of a casing which is part of a pneumatic tire wherein the tire has spaced apart annular sidewalls supporting a tread and circular beads around the tire on each sidewall for mounting on a rim, wherein the tire liner includes an annular strip of a tread supporting material defining an annular length which conforms to the shape of the U-shaped surface of the tire casing opposite the tread and wherein the width of the annular strip is defined by two opposite long sides which are between two opposite short sides defining a thickness along the length which comprises: a first annular strip of a tread supporting material which allows low temperature and pressure vulcanizable rubber to flow and to bond to the first strip; low temperature and pressure (LPT) vulcanizable rubber vulcanized to the sides of the first strip wherein the liner assumes the U-shape of the tire casing on the side to be in contact with the casing and wherein the vulcanized LPT rubber at the short sides of the first strip are each tapered to an edge and wherein there are two parallel grooves adjacent to each tapered edge in the LPT vulcanized rubber on the side of the liner opposite to the side opposite the side to be in contact with the tire casing.

Generally the tire liner is removed from the mold, which is usually a tire casing and an inner tube together; however, in the instance where a tire casing is used as a mold the liner can remain in place in the tire which is placed into service. It can also be vulcanized to the tire casing by cleaning the casing and using a rubber cement.

SPECIFIC DESCRIPTION

Figure 3:
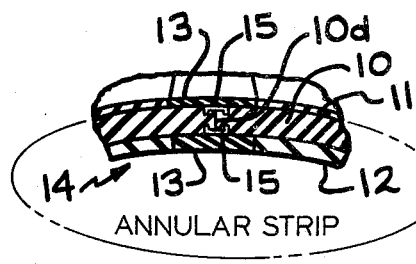
FIG. 3 is a longitudinal cross-sectional view of joined ends of the first elongate strip formed into an annulus, preferably with the ends cemented together, and surrounded by LPT vulcanizable rubber strips and particularly illustrating the use of staples to hold the ends of the first strip together prior to and during vulcanization and in use.
Figure 4A:
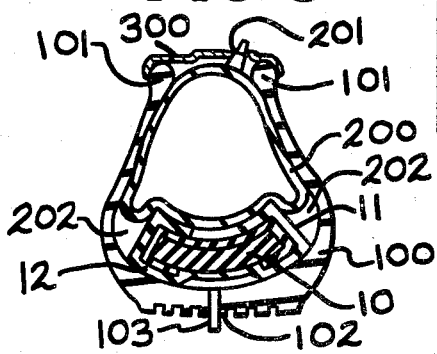
FIG. 4A shows a front cross-sectional view of the LPT vulcanizable rubber strip and first strip assembly prior to vulcanization in a tire casing with an inner tube serving as a closed mold and FIG. 4B shows a partial view of the tire with the formed improved tire liner product between the tube and the casing after vulcanization.
Figure 4B:
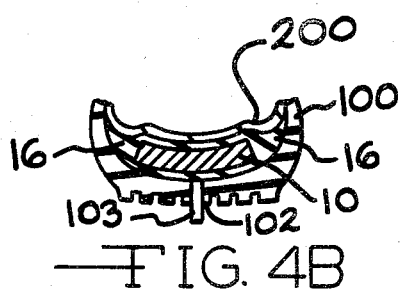
Figures 5, 6, 7:
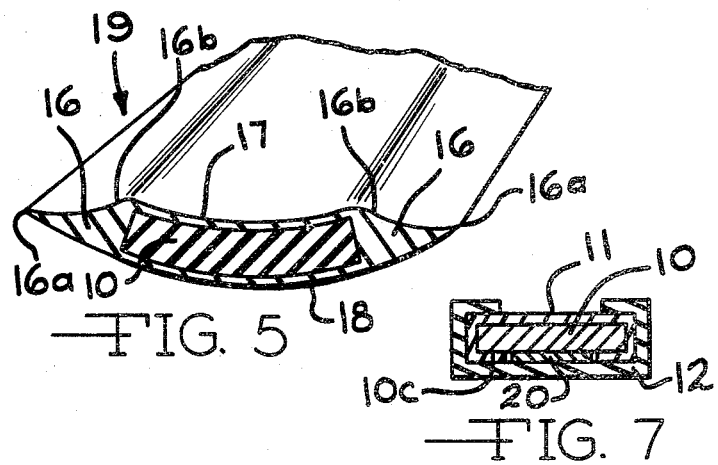
FIG. 5 shows a front perspective cross-sectional view of the preferred improved tire liner product removed from the tire mold. The tire liner can be molded in and even bonded to the tire in which it is to be used and thus may not be removed from the casing.
FIG. 6 is a schematic diagram illustrating the Steps 1 to 5 of the preferred method of the present invention as shown in FIGS. 1 to 5.
FIG. 7 is a front cross-sectional view of LPT vulcanizable rubber bonded to the first strip in the manner of FIG. 2 prior to vulcanization except that an additional strip of LPT vulcanizable rubber is provided along one side of the first strip as an additional source of vulcanizable rubber which flows to the short sides of the first strip during vulcanization.

The steps of the preferred method of the present invention are set forth in FIG. 6 and are illustrated in FIGS. 1 to 5. Thus an elongate HPT vulcanized strip 10 is used for fabricating the tire liner and includes long sides 10a and 10c, short sides 10b and ends 10d. The strip 10 is surrounded by at least two (2) thin cross-sectioned second elongate strips 11 and 12 of LPT vulcanizable rubber which are bonded using a vulcanizable rubber cement to the first strip. The long side 10a of the strip 10 has a relatively thin strip 11 and is to be positioned adjacent to the inner tube 200 during molding as shown in FIG. 4A. The thicker strip 12 on long side 10c is to be adjacent to the tread 102 as shown in FIG. 4A. In step 3 the ends 10d of the HPT rubber strip are bonded together with a vulcanizable rubber cement and are straddled on both long sides 10a and 10c with heavy staples 15 to hold the ends 10d together. The ends 10d of the HPT strip 10 are then covered with additional strips of LPT rubber 13 over the staples 15. The finished assembly 14 as an annular strip is then ready for vulcanization in Step 4. In Step 4, the annular strip 14 to be vulcanized is provided in a tire casing 100 which serves as part of a closed mold with the inner tube 200. The casing 100 has the usual beads 101 adjacent to a mounting rim 300 and can have the usual tread 102 which is usually removed for high production when reusing the casing 100. The casing 100 is preferably provided with an air vent 103. The inner tube 200 is aired through valve 201 to make the assembly 14 conform to the U-shaped configuration of the casing 100 with spaces 202 on either side.

In Step 4B, the assembly is then vulcanized to cause the LPT vulcanizable rubber to flow into spaces 202 as shown in FIG. 4A and to permanently bond to the HPT strip 10. During vulcanizing, the LPT rubber flows to form wings 16 on the short sides 10b of the HPT strip 10. The wings 16 come to a tapered edge 16a. Preferably there are two parallel grooves 16b in the LPT rubber of the wings 16 adjacent the tube 200. This results from the rectangular cross-section of the strip 10. The LPT rubber 11 and 12 flows to form the wings 16 during vulcanization along both the sides 10a and 10c to provide the sides 17 and 18 which are thinner than strips 11 or 12 as a result of the flow.

In Step 5 the tire liner 19 which is formed is usually removed from the mold 100; however, a new tire casing can be used for casing 100 as a mold without the vent 103 and the liner 19 left in place for use. The tire liner 19 is preferably not bonded to the tire casing and bonding is prevented by conventional parting agents such as powders, silicone oils and the like as are well known to those skilled in the art. For some applications the liner can be bonded to the tire casing 100 and can then be used with or without the inner tube 200.

In some instances where LPT additional vulcanizable rubber is needed in forming the wings 16, it can be provided on the core 10 as shown in FIG. 7. Thus a third elongate LPT rubber strip 20 is provided on the strip 10, preferably on side 10c, and then the LPT strips 11 and 12 are wrapped around the composite of the third LPT strip 20 and the HPT core 10. A second HPT strip (not shown) can be added, usually about half the width of the core 10, and centered on the thread side 10c of the core 10 over the LPT strip 12. LPT rubber is wrapped around the second HPT strip and LPT strip 12 and cured as in Step 4. These additional steps are desirable in forming large size tire liners which are used in truck and off-road vehicle applications.

The following is a specific example of the method of fabrication of a tire liner according to the method of the present invention.

EXAMPLE 1

The equipment in this example is conventionally used by tire recappers for bonding precured tread strips to the outside of a casing which has had the tread removed and is well known to those skilled in the art. The materials used included vulcanizable LPT rubber strips 11 and 12 having the dimensions of 0.060 by 8 inches wide and 0.150 by 8 inches wide. The HPT rubber strip 10 was so-called "slick" pre-cured rubber and is available from Bandag in Muscatine, Iowa as is the LPT rubber.

A tire casing 100 was selected to be used as a permanent mold for a specific size tire. The size was 1000×20. The casing 100 was buffed to remove the tread 102. At four places around the crown where the tread was located a hole was drilled with a ⅛ inch drill to form vents 103. The mold 100 was then treated with a silicone parting agent called "Liner Lube" and then talc powder to prevent any adhesion of LPT vulcanizable rubber to the casing 100.

The HPT strip 10 length was determined as follows: (1) The casing 100 was placed in a four-point outside arm spread (not shown) with the beads 101 at the inservice width (for a 1000 by 20 rim width the rim width is 7½ inches). (2) A chalk mark was made on the casing interior as near to the center as possible and a tapeless measure was rotated around the center of the tire casing until the chalk mark was reached again. This determined the 360° length of the HPT strip 10 which is required after deducting five percent (5%). The HPT strip 10 length was rounded off to the nearest ¼ of an inch. Thus for a 1000×20 tire the tape reading was 115.24 inches or 115¼ inches for the strip 10 length. The HPT strip 10 width was determined by using one-half (½) of the cross-section of the tire size for which the liner was being manufactured. Thus for a 1000×20 tire the core width was 5 inches. For tires which do not have the cross-section width marked on the tire, the width can be measured and then ½ of this width can be used as the HPT strip 10 width. The cross-section of the tire essentially represents the width of the casing 100.

Figure 2:
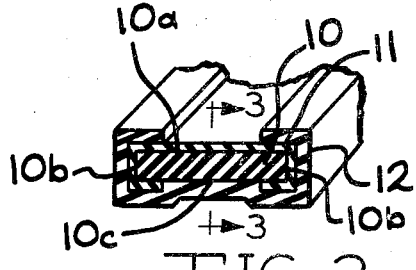
FIG. 2 is a front perspective cross-sectional view illustrating the first strip surrounded by second strips of LPT vulcanizable rubber which are bonded to the first strip with a rubber cement.

The HPT rubber strip 10 which was cut as previously indicated was buffed at the ends 10d and sides 10a, 10b and 10c in order to insure good adhesion with the LPT rubber strips 11 and 12. The HPT strip 10 was carefully cleaned with rubber solvent and then cement was applied to the strip 10. The 8¼ inch by 0.060 LPT strip 11 was applied to the core 10 on the side 10a to be adjacent to the inner tube 200. The 0.150 LPT strip 12 was then applied as shown in FIG. 2 using the rubber solvent cleaner and then low temperature cement. The ends 10d were provided with cushion rubber cemented between them to bond them together as shown in FIG. 3. After making a loop with the core 10, the ends 10d were stitched together with a screwdriver or similar tool to remove air from the joint. The staples 15 (5/16 inch) were placed about ¾ to 1 inch apart on both sides of the ends 10d. The LPT strip 13 was then applied over the staples 15 using a piece of the 0.150 strip 12.

The annular strip assembly 14 was now ready to be placed in the mold 100. The casing 100 was placed on a four-point spreader which holds the casing vertically. The casing 100 was spread and talc was applied on the inside. The annular strip assembly 14 was folded twice making sure that the stapled ends 10d were not in the area of a fold and was placed inside the casing 100 with the stapled ends 10d facing down. The assembly 14 in the mold had a slight loop separation from the inside surface of the casing 100 opposite the stapled ends 10d. As the spreader was released, the loop was forced into the mold so that the annular strip 14 forms a complete circle of contact with the inside of the casing 100. An inner tube 200 which was one size smaller than used for the casing 100 tire size was covered with a silicon lubricating compound to prevent bonding. The assembly was then placed on a quick change tire rim 300 and placed in a conventional tread curing heated pressure chamber as shown in U.S. Pat. Nos. 3,236,709, 3,951,720, 4,046,947 and 4,075,047. The liner was cured in the chamber for about three hours and forty minutes of curing at 210°–235° F., a pressure in the tube 200 of 35 to 120 psig and a pressure in the chamber of 0–80 psig. Normally there is about 35 psi difference in pressure between the inside of the tube 200 and the outside of the tire 100. A heat chamber at ambient pressures can also be used. After the curing vulcanization was complete, the casing 100 and with tire liner 19 was removed from the pressure chamber and the tire liner 19 was removed from the mold 100 using a flat tire spoon to start separation of the liner 19 from the casing 100. The liner 19 was then pulled from the casing 100 which was then reused.

The staples 15 provide a preferred method for joining the ends of the tire liner 19 together. It has been found that there is no reason to remove the staples 15 prior to the use of the tire liner 19, since they are covered by the LPT vulcanized rubber and they safely prevent separation of the ends 10d of the strip 10 in use.

The preferred first elongate core strip is the HPT vulcanized rubber since it bonds well to the LPT rubber and provide an excellent tire liner. It will be appreciated that other tread supporting materials which will unite with LPT vulcanizable rubber, such as metal and plastic strips, can be used. During molding the first strip is usually bent to the U-shape of the tire casing. Also, the tire liner can be held in place by an inner tube such that it is removeable from the tire casing or the liner can be vulcanized or otherwise bonded to the tire casing and used with or without a tube, preferably during the molding and vulcanizing step.

Using this procedure, tire liners 19 were produced which were tested for many thousands of miles at various speeds on a truck with inner tubes without any problems because of the method of construction. The method significantly reduced manufacturing costs. The liner can also be used with tubeless tires by being bonded to the inside of the tire casing with the LPT rubber as it flows to the short sides of the precured rubber strip.

Broadly the present invention involves the improvement in the method for preparing an annular shaped tire liner adapted to fit around and in contact with the inside U-shaped surface of a casing which is part of a pneumatic tire, wherein the tire has spaced apart annular sidewalls supporting a tread and circular beads around the tire on each sidewall for mounting on a rim, wherein the tire liner includes an annular strip of a tread supporting material defining an annular length and a width such that the strip is positionable adjacent to the U-shaped surface of the tire casing opposite the tread, and wherein the width of the annular strip is defined by two opposite long sides which are between two opposite short sides defining a thickness along the length, which comprises the steps of providing a first annular strip of a tread supporting material which allows low temperature and pressure vulcanizable rubber to flow around and to bond to the first strip and at least one second strip of low temperature and pressure (LPT) vulcanizable rubber bonded on at least one long side of the first strip and molding and vulcanizing the LPT vulcanizable rubber to the first strip to form an annular shaped tire liner, wherein some of the LPT vulcanizable rubber flows across the long side width to the short sides of the first annular strip. In this instance the first annular strip could be a preformed ring including a molded ring. Numerous variations will occur to those skilled in the art.

I claim:

1. In the method for preparing an annular shaped tire liner adapted to fit around and in contact with the inside U-shaped surface of a casing which is part of a pneumatic tire, wherein the tire has spaced apart annular sidewalls supporting a tread and circular beads around the tire on each sidewall for mounting on a rim, wherein the tire liner includes an annular strip of a tread supporting material defining an annular length and a width such that the strip is positionable adjacent to the U-shaped surface of the tire casing opposite the tread, and wherein the width of the annular strip is defined by two opposite long sides which are between two opposite short sides defining a thickness along the length, the improvement which comprises the steps of:
   (a) providing a first elongate strip of a tread supporting material which allows low temperature and pressure vulcanizable rubber to flow around and to bond to the first strip and with ends adapted to be joined together to form the annular strip;
   (b) providing at least one second elongate strip of low temperature and pressure (LPT) vulcanizable rubber bonded on at least one long side of the first strip;
   (c) forming the bonded first and second elongate strips into the annular strip by joining the ends of the first strip together; and
   (d) molding and vulcanizing the LPT vulcanizable rubber to the first strip to form an annular shaped tire liner, wherein some of the LPT vulcanizable rubber flows across the long side width to the short sides of the first annular strip.

2. The method of claim 1 wherein the tire liner is adapted to be held in place in the tire casing by an inner tube and is removable from the tire casing after removal of the inner tube.

3. The method of claim 1 wherein the tire liner is permanently bonded to the inside of the casing.

4. In the method for preparing an annular shaped tire liner adapted to fit around and in contact with the inside U-shaped surface of a casing which is part of a pneumatic tire, wherein the tire has spaced apart annular sidewalls supporting a tread and circular beads around the tire on each sidewall for mounting on a rim, wherein the tire liner includes an annular strip of a high temperature and pressure (HPT) vulcanized rubber defining an annular length which conforms to the shape of the U-shaped surface of the tire casing opposite the tread, and wherein the strip has a width across the tread defined by two opposite long sides which are between two opposite short sides defining a thickness along the length the improvement which comprises the steps of:
   (a) providing the HPT vulcanized rubber as a first elongate strip with ends defining a length adapted to be joined together to form the annular strip of rubber;
   (b) providing at least one second elongate strip of low temperature and pressure (LPT) vulcanizable rubber bonded on at least one long side of the first strip;
   (c) forming the bonded first elongate strip with the second elongate strip into the annular strip by joining and bonding the ends of the first HPT strip together; and
   (d) vulcanizing the LPT vulcanizable rubber to the annular strip in a closed mold to form the tire liner, wherein some of the LPT vulcanizable rubber flows across the long side width to both short sides of the first annular strip of HPT vulcanized rubber.

5. In the method for preparing an annular shaped tire liner adapted to fit around and in contact with the inside U-shaped surface of a casing which is part of a pneumatic tire and around and in contact with the outside of an inner tube for the tire so as to be between the inner tube and the casing to reduce the frequency of flat tires, wherein the tire has spaced apart annular sidewalls supporting a tread and circular beads around the tire on each sidewall for mounting on a rim, wherein the tire liner includes an annular strip of a high temperature and pressure (HPT) vulcanized rubber defining an annular length which conforms to the shape of the U-shaped surface of the tire casing opposite the tread and wherein the strip has a width across the tread defined by two opposite long sides which are between two opposite short sides defining a thickness along the length and wherein the tire liner provides for substantial protection against and resistance to penetration of the inside casing to the inner tube by a foreign object the improvement which comprises the steps of:

(a) providing the HPT vulcanized rubber as a first elongate strip with ends defining a length adapted to be joined together to form the annular strip of rubber;

(b) providing at least two thin cross-sectioned second elongate strips of low temperature and pressure (LPT) vulcanizable rubber bonded on the long sides of the first strip, each of the LPT strips having widths which are greater than the width of one long side of the first elongate strip, which are wrapped around and bonded to both short sides and one long side of the first elongate strip such that there is one second elongate strip across each long side of the first elongate strip;

(c) forming the bonded first elongate strip with the second elongate strip into the annular strip by joining the ends of the first HPT strip together such that there is LPT vulcanizable rubber surrounding the joined ends of the first strip; and (d) vulcanizing the LPT vulcanizable rubber to the annular strip in a closed mold to form the tire liner, wherein some of the LPT vulcanizable rubber flows across the long side widths to both short sides of the first annular strip of HPT vulcanized rubber.

6. The method of claim 5 wherein the first elongate strip has a rectangular cross-section prior to forming the annular strip.

7. The method of claim 6 wherein the first elongate strip has a width defined by the two long sides equal to about one-half of maximum width of the tire cross-section with the tire beads spread to an in-service width.

8. The method of claim 5 wherein the closed mold is shaped like the inside of a tire casing with the beads spread to an in-service width and wherein the first elongate strip has a length which is about five percent less than the maximum inside circumference of the mold.

9. The method of claim 8 wherein the mold has openings adapted for removing air from between the liner and the mold during vulcanizing.

10. The method of claim 5 wherein an additional thin cross-sectioned third strip of LPT vulcanizable rubber is bonded partially across at least one long side and along the length of the first elongate strip prior to the bonding of the second elongate strips to the first elongate strip to provide additional LPT vulcanizable rubber.

11. The method of claim 5 wherein the first elongate strip is not bonded to LPT vulcanizable rubber immediately adjacent the ends to be joined together in step (b), wherein the ends of first elongate strip are stapled and bonded together to form an annular strip and wherein stapled ends of the first elongate strip are then bonded with additional strips of LPT vulcanizable rubber in step (c) prior to vulcanization.

12. The method of claim 5 wherein the mold is the inside of a pneumatic tire casing of the size into which the tire liner is to be mounted in use.

13. The improvement in a tire liner adapted to fit around and in contact with the inside U-shaped surface of a casing which is part of a pneumatic tire wherein the tire has spaced apart annular sidewalls supporting a tread and circular beads around the tire on each sidewall for mounting on a rim, wherein the tire liner includes an annular strip of a tread supporting material defining an annular length which conforms to the shape of the U-shaped surface of the tire casing opposite the tread and where the width of the annular strip is defined by two opposite long sides which are between two opposite short sides defining a thickness along the length which comprises:

(a) a first annular strip of a tread supporting material which allows low temperature and pressure vulcanizable rubber to flow and to bond to the first strip;

(b) low temperature and pressure (LPT) vulcanizable rubber vulcanized to the sides of the first strip wherein the liner assumes the U-shape of the tire casing on the side to be in contact with the casing and wherein the vulcanized LPT rubber at the short sides of the first strip are each tapered to an edge and wherein there are two parallel grooves adjacent to each tapered edge in the LPT vulcanized rubber on the side of the liner opposite to the side opposite the side to be in contact with the tire casing.

14. The liner product of claim 13 wherein the first strip is composed of high temperature and pressure vulcanized rubber and is rectangular in cross-section.

15. In the method for preparing an annular shaped tire liner adapted to fit around and in contact with the inside U-shaped surface of a casing which is part of a pneumatic tire, wherein the tire has spaced apart annular sidewalls supporting a tread and circular beads around the tire on each sidewall for mounting on a rim, wherein the tire liner includes an annular strip of a tread supporting material defining an annular length and a width such that the strip is positionable adjacent to the U-shaped surface of the tire casing opposite the tread, and wherein the width of the annular strip is defined by two opposite long sides which are between two opposite short sides defining a thickness along the length, the improvement which comprises the steps of:

(a) providing a first annular strip of a tread supporting material which allows low temperature and pressure vulcanizable rubber to flow around and to bond to the first strip and at least one second strip of low temperature and pressure (LPT) vulcanizable rubber bonded on at least one long side of the first strip; and (b) molding and vulcanizing the LPT vulcanizable rubber to the first strip to form an annular shaped tire liner, wherein some of the LPT vulcanizable rubber flows across the long side width to the short sides of the first annular strip.

* * * * *